United States Patent [19]

Franz et al.

[11] Patent Number: 4,578,203

[45] Date of Patent: Mar. 25, 1986

[54] POLYMER SOLUTION WORKING FLUID FOR FINISHING PROCESSES

[75] Inventors: Helmut Franz; James H. Hanlon, both of Pittsburgh; Lloyd G. Shick, Natrona Heights, all of Pa.

[73] Assignee: PPG Industries, Inc., Pittsburgh, Pa.

[21] Appl. No.: 481,418

[22] Filed: Apr. 1, 1983

[51] Int. Cl.$^4$ ............... C10M 149/10; C10M 173/02
[52] U.S. Cl. ................. 252/49.3; 252/11; 252/50; 252/52 R; 83/22
[58] Field of Search .............. 252/11, 49.3, 50, 52 R; 83/22

[56] References Cited

U.S. PATENT DOCUMENTS

| | | | |
|---|---|---|---|
| 3,630,898 | 12/1971 | Teeter et al. | 252/49.3 X |
| 3,634,243 | 1/1972 | Wessels et al. | 252/49.3 X |
| 3,833,502 | 9/1974 | Leary et al. | 252/49.3 X |
| 3,894,456 | 7/1975 | Boller et al. | 83/7 |
| 3,914,180 | 10/1975 | Boller et al. | 252/58 |
| 3,980,571 | 9/1976 | Marx | 252/49.3 X |
| 4,084,737 | 4/1978 | Gorman et al. | 225/2 |
| 4,311,764 | 1/1982 | Franz | 252/49.3 |

OTHER PUBLICATIONS

Evans, J. W., "The Machining of Glass", Glass Industry, vol. 47, 2/66, pp. 78-83 & 110.

*Primary Examiner*—Jacqueline V. Howard
*Attorney, Agent, or Firm*—Donna L. Seidel

[57] ABSTRACT

A method is disclosed for protecting a substrate surface from particulate contaminants in a process using a working tool in conjunction with a working fluid, by employing as the working fluid a solution of a soluble polymer such as polyvinylpyrrolidone.

18 Claims, No Drawings

POLYMER SOLUTION WORKING FLUID FOR FINISHING PROCESSES

BACKGROUND OF THE INVENTION

The present invention generally relates to the art of working fluids, that is, liquids to be employed at the interfaces between workpieces and working tools to facilitate processing, and more particularly relates to a working fluid that protects the surface of the article being processed.

U.S. Pat. Nos. 3,894,456 and 3,914,180 to Boller et al disclose a cutting fluid comprising methyl chloroform and a non-volatile hydrocarbon oil. The methyl chloroform acts as a cutting tool lubricant and then evaporates, while the hydrocarbon oil forms a residue on a scored glass surface which binds wing chips along the edge of the score to prevent spalling.

U.S. Pat. No. 4,084,737 to Gorman et al discloses an oil-free cutting fluid comprising one or more halogenated hydrocarbons dissolved in one or more paraffinic, naphthenic or aromatic solvents. The cutting fluid completely evaporates, leaving no residue on a scored glass surface.

During fabrication and finishing work on glass, plastics, and laminated articles such as automobile windshields and aircraft transparencies, solid particulate debris such as dirt, dust or grinding grit, as well as filings from various materials and glass chips, come in contact with the substrate surfaces. These contaminants have a tendency to adhere tenaciously to the surfaces of various substrates being processed throughout subsequent handling and cleaning procedures, and can seriously damage the substrate surfaces. Such damage is minimized in accordance with the present invention.

SUMMARY OF THE INVENTION

The present invention provides a method for reducing the adherence of contaminants to the surface of a substrate being processed, and thereby minimizing damage to the surface during subsequent fabrication, handling, storage, transit, or installation of the finished article. The present invention involves feeding to the interface between a working tool and a workpiece a working fluid comprising a solution of a soluble polymer. The polymer solution acts to encapsulate or at least suspend particulate contaminants such as dust, dirt, grinding grit, metal filings or glass chips, and prevent their adherence to the substrate surface. After such processing, the substrate may bear a thin film of the polymer which is easily rinsed off since the polymer is soluble.

DESCRIPTION OF THE PREFERRED EMBODIMENTS

Substrates being processed are protected against surface damage from particulate contaminants such as dirt and debris by employing at the interface between the substrate and processing equipment a working fluid comprising a solution of a polymer which acts to encapsulate or suspend particulate contaminants to prevent their adherence to the substrate surface. The polymer is preferably soluble in water and/or water miscible alcohols and ketones such as methanol, ethanol, propanol, acetone, methyl ethyl ketone and so on. Most preferably, the polymer is water soluble, and the preferred solvent is water. A preferred polymer is polyvinylpyrrolidone, in concentrations up to about 30 percent, preferably 1 to 20 percent.

In one embodiment of the present invention, glass sheets laminated to plastic interlayers sometimes require edge working to finish the edge if two sheets are not perfectly aligned. This edge working typically is accomplished by sanding down the edge using a belt sander wet with water. The process, known as seaming, generates siliceous debris which forms spots and streaks on the finished product. Line washing procedures do not effectively remove such debris; costly, time-consuming hand cleaning is required. In accordance with the present invention, the water used to wet the belt sander is replaced with a working fluid comprising an aqueous solution of a polymer such as polyvinylpyrrolidone, preferably containing a wetting agent. This working fluid prevents adherence of particulate contaminants on the glass surface. As a result, treated glass articles are clean following a single hot water rinse; no hand cleaning is required.

In another embodiment of the present invention, a working fluid comprising an aqueous solution of a polymer such as polyvinylpyrrolidone is used to wet a polishing wheel used to polish a glass substrate. This working fluid prevents adherence of cerium oxide slurry or rouge on the glass surface, thereby facilitating cleaning of the finished article.

The present invention will be further understood from the descriptions of specific examples which follow.

EXAMPLE I

Glass laminates are subjected to edge working (seaming) using a belt sander wet with an aqueous solution comprising 2 percent polyvinylpyrrolidone and 0.1 percent of a wetting agent, available as ZONYL-FSN from DuPont. For comparison, glass laminates are subjected to the same seaming operation with the belt sander wet with water. Following the edge seaming procedures, both sets of laminates are passed through a hot water rinse. The glass laminates worked with polyvinylpyrrolidone solution have slight spotting at the bottom of each, but the laminates worked with plain water are heavily streaked and spotted overall, and require hand cleaning with glass cleaner.

EXAMPLE II

Glass laminates are subjected to edge seaming as in the previous example, except that the working fluid comprises 5 percent polyvinylpyrrolidone. After a single hot water rinse, most samples are completely clean, while some had spots at the bottom. In comparison, untreated laminates are badly streaked and spotted all over.

EXAMPLE III

Glass laminates are subjected to edge seaming as in the previous examples, except that the working fluid comprises 10 percent polyvinylpyrrolidone. After a single hot water rinse, all samples are completely clean. There are no visible spots or streaks.

The above examples are offered to illustrate the present invention, which has various modifications. For example, other soluble polymers may be employed, such as polyvinylalcohols, or polyvinylpyrrolidone/polyvinylacetate copolymers; other solvents may be used, such as water miscible ketones and alcohols. The working fluids encompassed by the present invention may be employed in other processes such as cutting, grinding, polishing, and so on, and may be used in processing substrates other than glass, such as plastics. The scope of the present invention is defined by the following claims.

We claim:

1. In a method of processing a nonmetallic substrate wherein a working fluid is supplied at the interface between the substrate and a working tool, and the substrate is exposed to particulate contaminants, the improvement which comprises supplying a working fluid comprising a solution of a soluble film-forming polymer in an amount which prevents adherence of particulate contaminants on the substrate surface in a solvent selected from the group consisting of water, water-miscible alcohols, water-miscible ketones, and mixtures thereof.

2. The method according to claim 1, wherein the substrate is selected from the group consisting of glass and polymeric materials.

3. The method according to claim 2, wherein the substrate is glass.

4. The method according to claim 3, wherein the solution comprises a solvent selected from the group consisting of water, methanol, ethanol, propanol, acetone, methyl ethyl ketone and mixtures thereof.

5. The method according to claim 4, wherein the solvent is water.

6. The method according to claim 5, wherein the solution further comprises an effective amount of a wetting agent.

7. The method according to claim 6, wherein the polymer is selected from the group consisting to polyvinylpyrrolidone, polyvinylalcohols and copolymers thereof.

8. The method according to claim 7, wherein the polymer is polyvinylpyrrolidone.

9. In a method of working the edge of a glass article by sanding the edge with a wet belt sander, the improvement which comprises wetting the belt with a solution of soluble polymer in an amount which prevents adherence of particulate contaminants on the substrate surface in a solvent selected from the group consisting of water, water-miscible alcohols, water-miscible ketones and mixtures thereof.

10. The method according to claim 9, wherein the solution is an aqueous solution.

11. The method according to claim 10, wherein the solution further comprises an effective amount of a wetting agent.

12. The method according to claim 11, wherein the polymer is polyvinylpyrrolidone.

13. The method according to claim 12, wherein the solution comprises 1 to 20 percent polyvinylpyrrolidone.

14. In a method for working a glass article with a wet grinding wheel, the improvement which comprises wetting said wheel with a solution of a soluble polymer in an amount which prevents adherence of particulate contaminants on the substrate surface in a solvent selected from the group consisting of water, water-miscible alcohols, water-miscible ketones and mixtures thereof.

15. The method according to claim 14, wherein the solution is an aqueous solution.

16. The method according to claim 15, wherein the solution further comprises an effective amount of a wetting agent.

17. The method according to claim 14, wherein the polymer is polyvinylpyrrolidone.

18. The method according to claim 17, wherein the solution comprises 1 to 20 percent polyvinylpyrrolidone.

* * * * *